US007796692B1

(12) United States Patent
Falardeau et al.

(10) Patent No.: US 7,796,692 B1
(45) Date of Patent: Sep. 14, 2010

(54) AVOIDING STALLS TO ACCELERATE DECODING PIXEL DATA DEPENDING ON IN-LOOP OPERATIONS

(75) Inventors: Brian Dennis Falardeau, Broomfield, CO (US); Piers J. Daniell, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 1330 days.

(21) Appl. No.: 11/286,234

(22) Filed: Nov. 23, 2005

(51) Int. Cl.
*H04N 7/12* (2006.01)
*G06K 9/36* (2006.01)

(52) U.S. Cl. .................. 375/240.12; 382/233; 382/274; 375/240.25

(58) Field of Classification Search ......... 382/165–166, 382/382–251; 375/240.01–240.29
See application file for complete search history.

(56) References Cited

U.S. PATENT DOCUMENTS 7,227,901 B2 * 6/2007 Joch et al. .............. 375/240.29
7,650,031 B2 * 1/2010 Liu et al. ................. 382/165

* cited by examiner

*Primary Examiner*—Sherali Ishrat
(74) *Attorney, Agent, or Firm*—Cooley LLP

(57) ABSTRACT

A video coding apparatus, a decoder and a method for deferring the decoding of blocks of pixel data not yet ready for decoding during which other blocks of pixel data can be decoded nearly immediately. By deferring decoding and allowing the decoder to continue to successive blocks, the decoder can reduce stalls in the decoding process, which in turn, can decrease idle time in the decoder as well as power consumption that otherwise occurs during such idle time. In one embodiment, an exemplary method decodes a bit stream representing video images. The method includes deblocking blocks of a first frame as first frame blocks, determining a block of a second frame depends on a reference block of the blocks, and deferring decoding of the block. In at least one embodiment, the method can include decoding other blocks of the second frame at least partially concurrent with deferring decoding of the block.

22 Claims, 8 Drawing Sheets

_US 7,796,692 B1_

AVOIDING STALLS TO ACCELERATE DECODING PIXEL DATA DEPENDING ON IN-LOOP OPERATIONS

BRIEF DESCRIPTION OF THE INVENTION

This invention relates generally to decoding digital video imaging, and more particularly, to a decoder configured to defer decoding of blocks of pixel data not yet ready for decoding while decoding those blocks of pixel data that can be decoded immediately (or nearly so). By decoding certain blocks immediately, the decoder can reduce stalls in the decoding process. This can decrease decoder idle time as well as power consumption, such as when the decoding process is idle.

BACKGROUND OF THE INVENTION

Generally, video encoders and decoders (collectively referred to as "CODECs") translate video image files between compressed and uncompressed states for efficiently transmitting video. Up until recently, most conventional video coding standards had either suboptimal or no effective techniques to, for example, reduce block distortion during video decoding. Specifically, those conventional coding standards reduce image distortion by filtering entire frames of video (i.e., completely decoded frames) during a post-process subsequent to the decoding process. In one approach to improve coding efficiency, as well as minimize ringing and blocking artifacts, at least one conventional coding scheme implements an "in-loop" deblocking filter. In particular, the deblocking filter is disposed in the same loop or path so that motion compensation operations can use previously deblocked frames (i.e., reference frames) rather than decoded video that is yet to be deblocked. Typically, a deblocking filter operates to smooth the edges of blocks to reduce perceptible boundaries between decoded blocks of pixels. This improves the appearance of decoded images. While functional, this traditional approach to implementing in-loop deblocking filtering has several drawbacks, as described next.

FIG. 1 is a common process flow showing drawbacks to decoding and deblocking in accordance with traditional in-loop filtering. FIG. 1 shows two frames—frame 0 and frame 1—each undergoing a decoding operation 102 and a deblocking filter operation 130. Once frame ("0") 100 is decoded, it is passed to deblocking filter operation 130 as frame ("0") 120 for generating a deblocked frame at time t0 on timeline 160. In particular, deblocking filter process 130 beings at block 122 and then deblocks subsequent blocks, on a block-by-block basis, in the same row from left to right. Then, deblocking filter process deblocks each subsequent row in a similar manner. As deblocking filter operation 130 processes frame ("0") 120 in a normal deblocking order from upper-left cornered blocks to lower-right cornered blocks, decoding operation 102 begins decoding frame ("1") 140 at block 152. But as is shown, block 152 depends on pixel data in a previous frame (e.g., frame 0) for proper decoding. For example, decoding of block 152 might depend on prediction data derived from block 124. Since decoding operation 102 cannot decode block 152 until block 122 and all intervening blocks up through block 124 are deblocked, decoding operation 102 for frame ("1") 140 is then "stalled" or delayed by an amount of time ("t_delay") 180. Fully decoded frame ("1") 140 is therefore decoded as frame ("1") 150 at time t1. Generally, amount of time 180 is equivalent to the amount of time needed by deblocking filter operation 130 to deblock frame ("0") 120. Afterwards, frame ("1") 170 is deblocked at time t2 by deblocking operation 130.

By stalling decoding of frame ("1") 140 until block 124 is deblocked, a conventional decoder has a drawback of delaying the decoding of that frame until time t1 rather than decoding it at time t0. In some cases, decoding operation 102 for frame ("1") 140 stalls until the entire frame ("0") 120 is deblocked. In other cases, decoding operation 102 for frame ("1") 140 stalls until block 124 is deblocked, which includes deblocking all intervening blocks up through block 124. While decoding operation 102 will then resume decoding frame ("1") 140, it may again stall on another block (not shown) that depends on frame ("0") 120, if such a dependency exists. Another drawback is that a decoder and other circuitry used to generate video images must remain idle for some time ("idle time") during cumulative amounts of time 180, thereby reducing the rate at which frames of video can be generated.

In view of the foregoing, it would be desirable to provide a decoder, an apparatus and a method that minimizes the above-mentioned drawbacks, thereby facilitating accelerated decoding.

SUMMARY OF THE INVENTION

Disclosed are a video coding apparatus, a decoder and a method for deferring the decoding of blocks of pixel data not yet ready for decoding during which other blocks of pixel data can be decoded immediately or nearly immediately. In one embodiment, a decoder can operate to defer decoding of blocks that have dependencies to reference frames undergoing a deblocking operation. This allows decoding to continue for blocks that do not dependencies. In another embodiment, the decoder can partially decode the deferred block nearly to the point of final construction for the frame. The block is completed once the reference frames are ready. By deferring blocks and moving on to decode successive, the decoder can reduce stalls in the decoding process, which in turn, can decrease idle time in the decoder and can increase frame rates, especially for video requiring rates of 20 Mbps (megabits per second) or higher. In one embodiment, an exemplary method decodes a bit stream representing video images. The method includes deblocking blocks of a first frame as first frame blocks, determining that a block of a second frame depends on a reference block of the blocks, and deferring decoding of the block. In at least one embodiment, the method can include decoding other blocks of the second frame at least partially concurrent with deferring decoding of the block. In one embodiment, the method deblocks the first frame blocks to generate decoded video data, which can also be referred to as reference data if used for generating prediction data for future frames. The deferred decoding of the block can occur during the generation of the prediction data, which includes the generation of reference data. This provides for parallel decoding subprocesses to reduce stalls that are at least due to, for example, decoding the block in series to the generation of the reference data and/or prediction data. In some embodiments, the method executes a first thread of program instructions to decode blocks while a second thread is used for deblocking previously decoded frames. Once a reference block for a deferred block has been deblocked, then the deferred block may be completed by using the reference data now available. In one embodiment, deferring decoding of the block can include calculating a residual for the block and storing the residual for at least a duration in which decoding of the block is deferred. In this case, calculating the residual and storing the residual occurs at least partially concurrent with deblocking blocks of the first frame.

In another embodiment of the invention, a decoder is configured to decode a frame constituting video images. For example, the decoder can include an in-loop controller configured to enable decoding of blocks of pixel data in the frame that are independent from another frame. In addition, the in-loop controller can be configured to defer decoding of a first subset of other blocks of pixel data in the frame that are dependent on the generation of reference data from another frame. Note that the decoding of the blocks can be independent of the deferment of the first subset of other blocks. In one embodiment, the decoder includes an in-loop operator configured to perform an in-loop operation to form decoded blocks of decoded pixel data for another frame (e.g., for a decoded frame). In a specific embodiment, the in-loop operator is an in-loop deblocking filter.

In yet another embodiment, an apparatus converts encoded video image data into decoded video images. The apparatus includes a decoder for generating blocks of pixel data for a frame. The decoder includes a residual path configured to generate residual data for the blocks, a prediction path configured to generate at least inter-frame prediction data, and an adder to add the residual data and the inter-frame prediction data to produce the blocks. The apparatus can also include a deblocking filter for smoothing the blocks to form reference blocks for another frame. The reference blocks provide pixel data as reference data from which to generate the prediction data. Also included is an in-loop controller configured to defer generating a subset of the blocks until a subset of the reference blocks are formed. In some embodiments, the decoder further includes an intra-frame prediction generator for generating intra-frame prediction data. The in-loop controller can be further configured to defer generating at least one block until another of the blocks is formed. For example, at least one block in the subset of the blocks can depend on intra-frame prediction data associated with another of the blocks. The prediction path can include a motion compensator and a data store for storing the reference blocks as decoded pixel data, for example. Also, note that the residual path can include an inverse quantizer and an inverse discrete cosine transformer ("IDCT"). In various embodiments, the decoder and the in-loop controller are implemented in a general purpose graphics processing unit ("GPGPU") and the deblocking filter is implemented as a separate integrated circuit. In some cases, the block is a macroblock ("MB") or sub-macroblocks of a macroblock. In one instance, the decoder facilitates compliance with digital video codec standard H.264 as maintained by the International Telecommunication Union ("ITU").

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
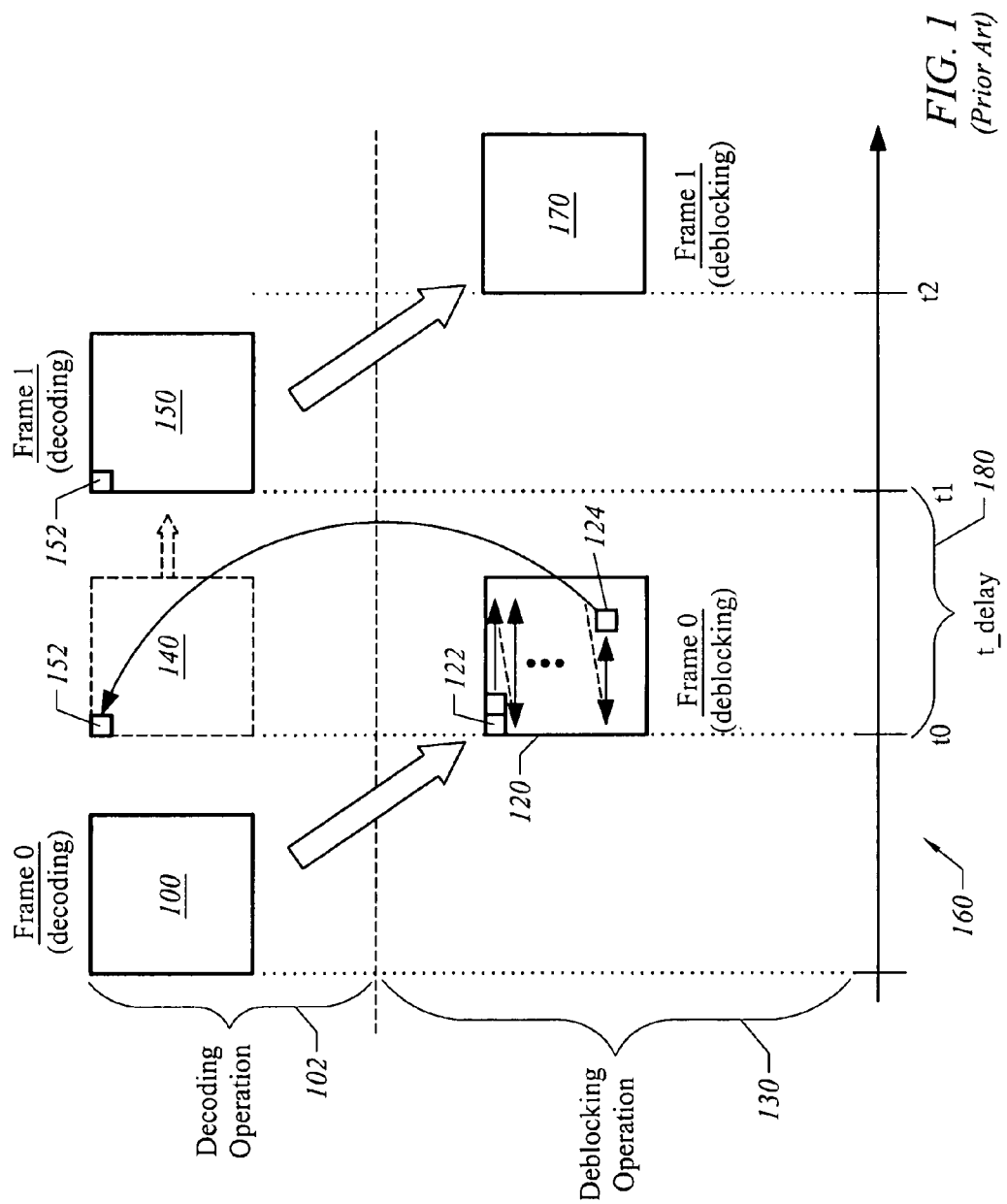
FIG. 1 is a common process flow showing drawbacks to decoding and deblocking in accordance with traditional in-loop filtering.
Figure 2A:
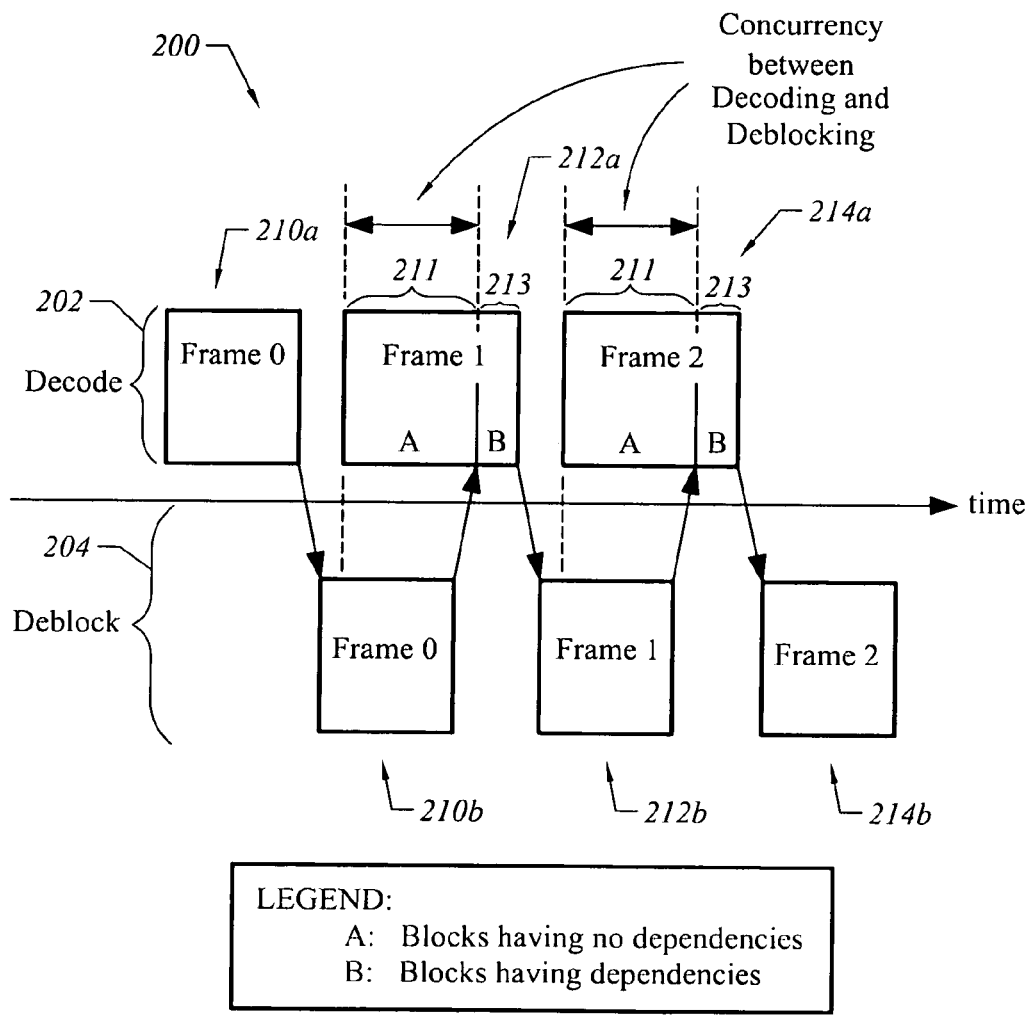
FIG. 2A is a block diagram depicting concurrency of decoding with deblocking by a decoding apparatus, according to at least one specific embodiment of the invention.

FIG. 2A is a block diagram depicting the concurrency of decoding and deblocking video frames, according to at least one specific embodiment of the invention. In particular, diagram 200 shows a decoder 202 decoding frames, such as frame ("0") 210a, frame ("1") 212a, and frame ("2") 214a. A deblocking operation 204 then deblocks each decoded frame to form deblocked frames, such as frame ("0") 210b, frame ("1") 212b, and frame ("2") 214b. As shown, decoder 202 operates to decode blocks ("A") 211 while deblocking operation 204 deblocks previous frames. Blocks ("A") 211 do not depend on previous blocks to be decoded, and therefore, they can be decoded concurrently with deblocking operation 204. Blocks ("B") 213, however, do depend on reference blocks of other frames for decoding. According to the various embodiments of the invention, decoder defers decoding of blocks ("B") 213 until decoded video data is available for the reference blocks. The decode time for blocks ("A") 211 can also include the time to partially decode the deferred blocks ("B"). Advantageously, decoder 202 can reduce stalls in the decoding process, which, in turn, can decrease idle time in decoder 213 and can increase frame rates, especially for video requiring rates of 20 Mbps (megabits per second) or higher.

Figure 2B:
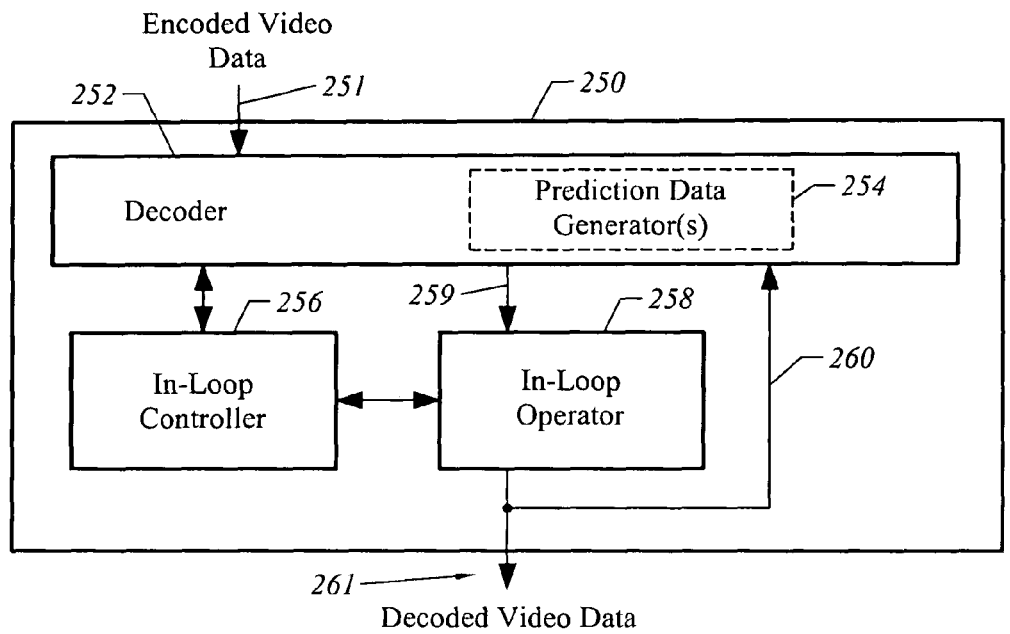
FIG. 2B is a block diagram of an apparatus that accelerates video image generation by deferring decoding of select blocks of pixel data so that other blocks can be decoded concurrent with the deferment, according to at least one specific embodiment of the invention.

FIG. 2B is a block diagram of an apparatus that accelerates video image generation by deferring decoding of select blocks of pixel data so that other blocks can be decoded concurrent with the deferment, according to at least one specific embodiment of the invention. Apparatus 250 includes a decoder 252, an in-loop controller 256 and an in-loop operator 258. In at least one embodiment, in-loop operator 258 is a deblocking filter configured to deblock decoded video data. Decoder 252 is at least configured to decode encoded video data 251 for generating decoded pixel data 259, which are requisites to generating enhanced, decoded video data 261. In-loop operator 258 is disposed within loop 260 and performs an in-loop operation, such as deblocking blocks of decoded pixel data 259, to form blocks of enhanced, decoded video data 261. In-loop operator 258 can also feed pixel data back to decoder 252. In at least one embodiment, loop 260 is a path that includes prediction data generator(s) 254 to generate prediction data, such as inter-frame prediction data, for decoding encoded video data 251. In-loop controller 256 is configured to control both the decoding operations of decoder 252 and the in-loop operations of in-loop operator 258 to accelerate formation of the blocks of enhanced, decoded video data 261, which constitute decoded video frames. As an example, consider that in-loop controller 256 can orchestrate deferment of one or more blocks of decoded pixel data 259, thereby enabling decoder 252 to continue decoding other blocks of the same frame or other frames. By doing so, in-loop controller 256 advantageously can reduce stalls during decoding operations, which in turn, decreases idle time during which decoder 252 is either decoding suboptimally or not at all. Avoiding stalls can also reduce power consumption that otherwise occurs when decoder 252 is idle. In some embodiments, apparatus 250 can be referred to as a "decoder" or a "decoding apparatus."

Figure 3:
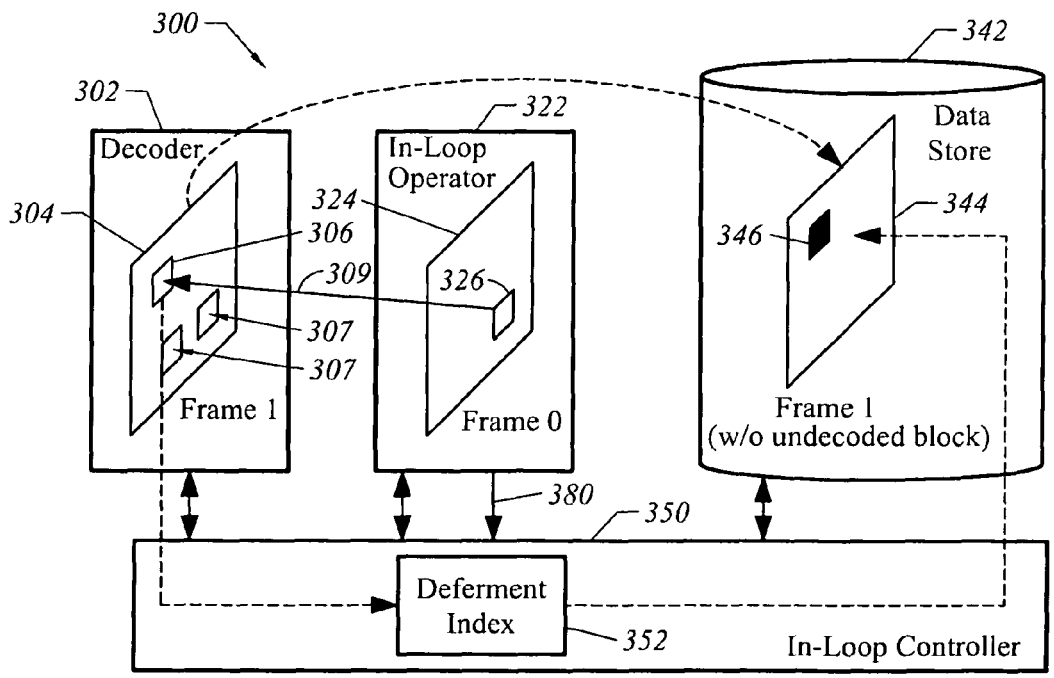
FIG. 3 is a functional block diagram of apparatus that depicts an in-loop controller to controlling parallel decoding and in-loop operations, according to at least one specific embodiment of the invention.

FIG. 3 is a functional block diagram of apparatus 300 that depicts an in-loop controller 350 for controlling parallel decoding and in-loop operations, according to at least one specific embodiment of the invention. In-loop controller 350 controls operations of those blocks deferred by decoder module 302. As shown, in-loop operator module 322 is performing an in-loop operation on frame ("0") 324, which has been previously decoded by decoder module 302. In at least one embodiment, in-loop operator module 322 is configured to function as a reconstruction filter (e.g., a deblocking filter). As such, in-loop operator module 322 can smooth the edges of blocks (i.e., to improve the appearance of decoded images, especially at higher compression ratios and at low bit rates) and can generate more accurate interframe prediction data than if in-loop operator module 322 is implemented as a post-process (i.e., external to loop 260 of FIG. 2B).

In FIG. 3, decoder module 302 is decoding frame ("1") 304, which in this case is subsequent to frame ("0") 324. Decoder module 302 can initiate its decoding process simultaneous to or nearly simultaneous to the operation of in-loop operator module 322. Consequently, decoder module 302 might select block 306 for decoding at a point in time when in-loop operator module 322 has yet to perform an in-loop operation on reference block 326. In particular, block 306 depends on reference block 326 for decoding. Reference block 326 is a block of pixel data in frame ("0") 324 that provides pixel data as a block of enhanced, decoded video data 261 (FIG. 2B). Decoder module 302 uses the pixel data (i.e., reference data) from reference block 326 to generate prediction data for decoding block 306. So if in-loop operator module 322 has yet to perform an in-loop operation on reference block 326, then the decoder module 302 determines the dependency and defers block 306 to the in-loop controller 350. The in-loop controller 350 stores a pointer to a memory location in data store 342 for any block that is deferred. In a specific embodiment, decoder module 302 includes the functionality and/or structure of in-loop operator module 322. Consequently, decoder module 302 can perform the operations described in FIG. 3 as being performed by in-loop operator module 322.

After the deferment of block 306, decoder module 302 continues decoding other blocks 307. As decoder module 302 decodes other blocks 307, it stores them in data store 342 as part of decoded frame ("1") 344. Note that data store 342 stores other blocks 307 as decoded frame ("1") 344 without deferred block ("undecoded block") 346 because block 306 has not yet been decoded. Thus, decoding of other blocks 307 can be independent of the deferment of block 306. In at least one embodiment, in-loop controller 350 instructs decoder module 302 to partially decode block 306 and to store the results in data store 342. For example, decoder 302 can calculate a residual prior to the termination of the deferral of block 306. As such, residual data representing the residual can be calculated independent of decoding of block 306 and stored as a partially decoded block 346. Advantageously, this enables residual calculations to be performed in parallel to other functions of apparatus 300, thereby reducing the amount of computations necessary to decode block 306 when it is no longer deferred.

When the in-loop operation on reference block 326 has completed, then its pixel data (i.e., reference data) is available to form prediction data. Thus, decoder module 302 can resume decoding deferred block 306 to finish decoding of frame ("1") 304. To resume decoding of block 306, in-loop operator 322 can send a notification signal 380 to in-loop controller 350 after it has completed an in-loop operation either on an entire frame ("0") 324 or on a subset of blocks (i.e., a section or portion) of frame ("0") 324. Notification signal 380 triggers an event prompting in-loop controller 350 to determine whether reference block 326 has been deblocked. After in-loop controller 350 identifies reference block 326 as being deblocked, in-loop controller 350 can use association 309 to identify residual data stored as partially decoded block 346, if any has been calculated in parallel to deferring block 306. Then, in-loop controller 350 can finally decode block 306 using the residual data from partially decoded block 346, thereby forming decoded frame ("1") 344. In at least one embodiment, decoder module 302 and in-loop operator module 322 each can be composed of either hardware or software, or any combination thereof. In a specific embodiment, decoder module 302 is implemented in a first thread of program instructions, in-loop operator module 322 is implemented in a second thread of program instructions, and in-loop controller module 350 is implemented in a third thread of program instructions. In alternative embodiments, one or more of the modules may be implemented in hardware, or two or more of the modules may be implemented in the same thread of program instructions.

Figure 4:
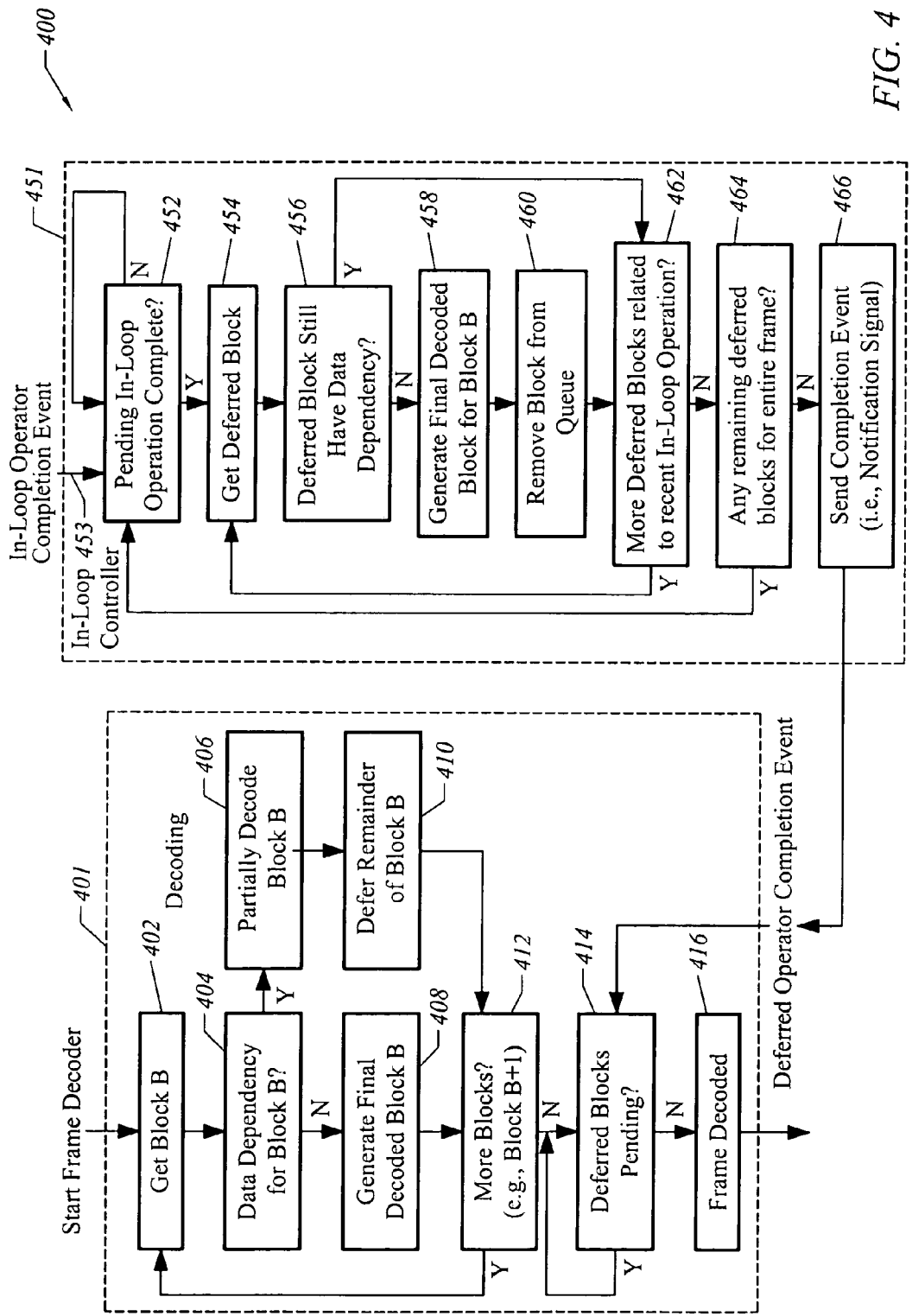
FIG. 4 is a flow diagram representing an example of a method for decoding video in accordance with an embodiment of the invention.

FIG. 4 is a flow diagram representing an example of a method for decoding video in accordance with an embodiment of the invention. Flow 400 includes two subflows: a subflow 401 and a subflow 451. Subflow 401 generally decodes blocks, whereas subflow 451 generally implements the in-loop controller. The in-loop operator (not shown) sends completion events 453 to in-loop controller of subflow 451. Flow 400 gets a block, "B," at 402 and then determines at 404 whether it depends on data necessary for decoding block B at 408. Then, flow 401 either decodes block B at 408 or defers block B. If decoding block B does not have a data dependency at 404, then subflow 401 proceeds to 408 at which block B is decoded. Note that block B might not require any prediction data, or it may use prediction data from blocks which the in-loop controller has completed.

If the decoding of block B requires prediction data at 404 that is still being processed by the in-loop controller, then subflow 401 proceeds to 406. For example, a decoder at 404 might require that the reference block be deblocked before the data can be used for prediction. Note that subflow 401 can partially decode block B at 406 and then defer the remainder of block B at 410 for later decoding. Partially decoding block B at 406 can include a residual calculation, followed by a storage operation (i.e., storing in a queue). Both the residual calculation and the storage operation are optional, and can further parallelize various embodiments of the invention to accelerate the video image decoding. In particular, subflow 401 can perform residual calculations in parallel with (1) the performance of in-loop operation (not shown) and (2) the decoding of other blocks. At 406, a residual for a partially decoded block B can be determined by, for example, by inversely quantizing and inversely transforming block B (e.g., using a discrete cosine transform, or "IDCT"). Again, subflow 401 can temporarily store or maintain the state of the residual, such as in a queue, until block B is no longer deferred (e.g., because the in-loop operation is complete).

Next, subflow 401 passes to 412 to decode more blocks. So long as there are more deferred blocks pending at 414 that require decoding, flow 400 continues with subflow 451. In particular, subflow 451 begins with a completion event 453 from the in-loop operator. In-loop operations can be performed on an entire frame or on portions thereof. After receiving completion event 453, subflow 451 continues to block 454 to begin iterating through the deferred blocks. At 456, subflow 451 determines if the current block still has a dependency based on information from completion event 453. If there is still a dependency, the subflow moves to 462 for the next deferred macroblock. If there is not a dependency, the subflow moves to 458 to complete decoding of the block, and then to 460 to remove the deferred block from the queue of remaining blocks. At 462, the subflow returns to 454 if there are more deferred macroblocks to process. After all of the deferred blocks have been processed for the current completion event, the flow moves to 464 to determine if there are still deferred blocks remaining after the current event. If so, the subflow returns to 452 to wait for the next completion event 453 from the in-loop operator. Once all deferred blocks have received their associated completion events, and after they have been decoded, the subflow moves to 466 to send a completion event to decoder subflow 401, which allows it to know that all deferred blocks have been processed. At this point, subflow 401 knows that the frame is decoded, and may be sent to the in-loop operator, which, in one example, performs deblocking of the decoded frame.

Figure 5:
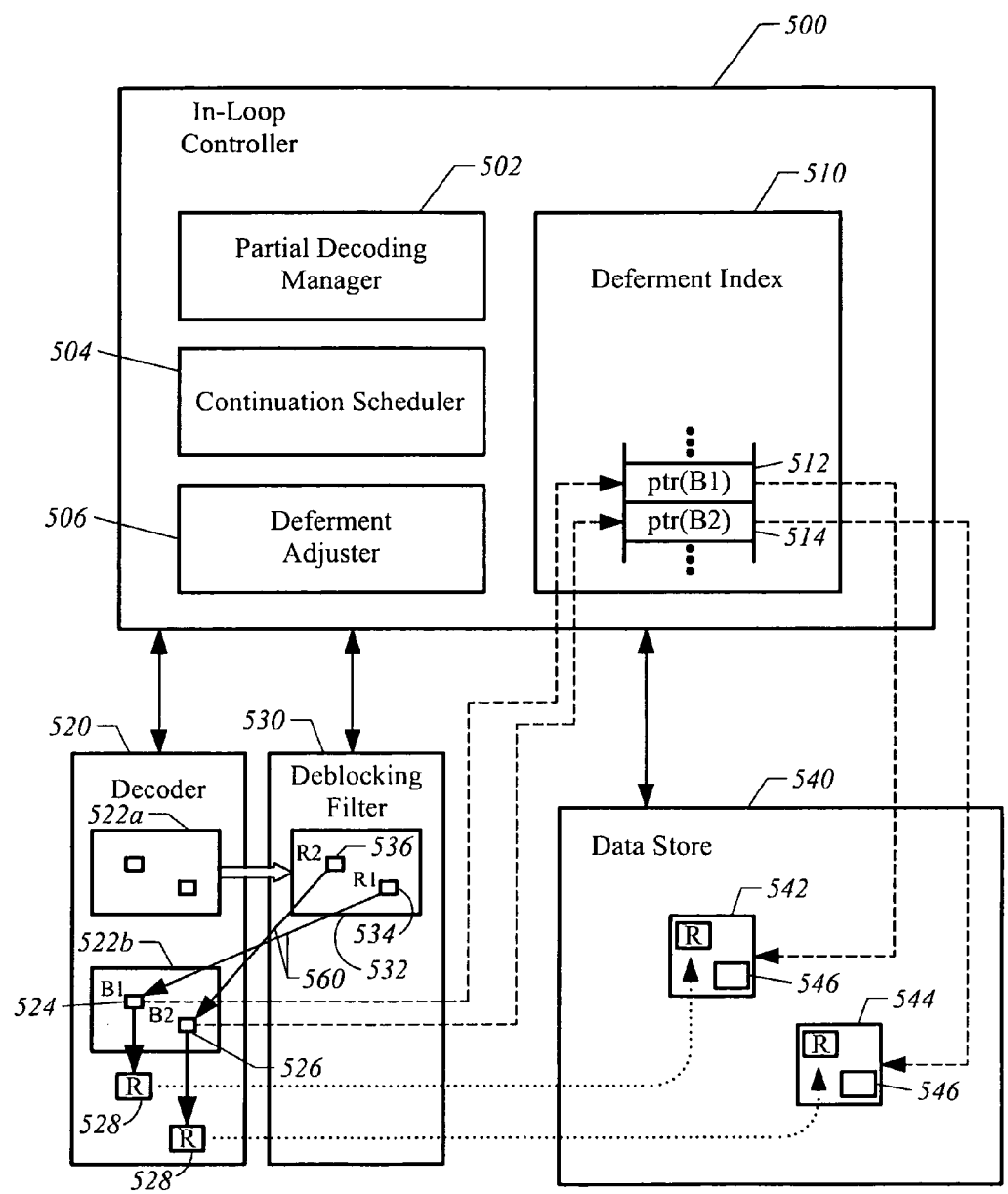
FIG. 5 is a block diagram of an example of an in-loop controller configured to control a deblocking filter in accordance with an embodiment of the invention.

FIG. 5 is a block diagram of an example of an in-loop controller configured to control a deblocking filter in accordance with an embodiment of the invention. An exemplary in-loop controller 500 can be configured to enable decoding of blocks of pixel data in one frame, where the decoding of those blocks is independent of pixel data in another frame. The in-loop controller 500 is also configured to defer decoding of one or more other blocks of pixel data in that one frame, where the decoding of these one or more other blocks is dependent on the generation of prediction data from another frame. Notably, in-loop controller 500 is configured to decode the blocks of the one frame independent one or more other blocks the same frame, thereby providing for parallelism between blocks that can immediately be decoded and those that are deferred. Here, in-loop controller includes a deferment index 510 and a partial decoding manager 502 to partially decode certain blocks. Also included is a continuation scheduler 504 to schedule which deferred block should be decoded next, and a deferment adjuster to adjust the length of time, a block is deferred by, for example, adjusting the number of blocks a deblocking filter deblocks prior to making the deblocked pixel data available for prediction data generation. In-loop controller 500 of various embodiments can include more or less than described above.

In-loop controller 500 is configured to control interactions among decoder 520, deblocking filter 530 and data store 540. For example, in-loop controller 500 maintains deferment index 510 as a list of blocks that are deferred because their corresponding reference blocks have yet to be deblocked. In a specific embodiment, deferment index 510 is a queue, such as buffer, that stores pointers to memory locations in a data store 540, such as pointer ("ptr(B1)") 512 and pointer ("ptr (B2)") 514. Each deferred block is related to a pointer (i.e., an association) stored in deferment index 510 for pointing to a memory location that will contain decoded and deblocked pixel data for a decoded frame after deferment. In one embodiment, data store 540 is a buffer having enough memory capacity to store pixel data (e.g., residual data and/or prediction data, combined or separate) for each block of one or more frames.

To illustrate, consider the example shown in FIG. 5. Decoder 520 has decoded frame 522*a* and has passed that frame to deblocking filter 530 as frame 532. Next, decoder 520 begins decoding frame 522*b*. As shown, frame 522*b* includes two blocks having data dependencies on another frame, which is frame 532. Namely, block ("B1") 524 and block ("B2") 526 depend on reference block ("R1") 534 and reference block ("R1") 536, respectively. Note the data dependencies generally exist because the deblocking operation of deblocking filter 530 has yet to deblock the reference blocks 534 and 536. In-loop controller 500 monitors the operations of decoder 520 and deblocking filter 530 and hence can track the data dependencies between the two operations. In this example, in-loop controller 500 stores pointers 512 and 514 for blocks 524 and 526, respectively, in deferment index 510. In-loop controller 500 uses these pointers to track which blocks in frame 522*b* remain deferred as well as locating where in data store 540 the decoded pixel data for the deferred blocks will be later stored. For example, FIG. 5 shows pointers 512 and 514 pointing to memory locations 542 and 544, respectively. After frame 532 has been entirely deblocked, or in some cases, after a portion (e.g., a quarter) of frame 532 has been deblocked, in-loop controller 500 polls deferment index 510 to identify which blocks of frame 522*b* have been deferred. Then in-loop controller 500 can initiate decoding of any block associated with a deblocked reference block.

In a specific embodiment, in-loop controller 500 includes partial decoding manager 502 to orchestrate residual calculations for at least those blocks being deferred. Here, partial decoding manager 502 instructs decoder 520 to generate residual data 528 during deferment of decoding blocks 524 and 526. In-loop controller 500 then can store residual data 528 for the blocks at respective memory locations 542 and 544. Advantageously, partial decoding manager 502 enables residual data 528 to be instantaneously available (i.e., without computation) for use in decoding blocks 524 and 526, thereby facilitating accelerated decoding. In a specific embodiment, deblocking filter 530 stores prediction data 546 in association with residual data 528 at memory locations 542 and 544. Decoder 520 then can readily locate both residual data 528 and prediction data 546 when decoding blocks 524 and 526. As used herein, "partial decoding" refers to a degree of decoding less than total decoding. In some embodiments, partially decoding a block includes additional decoding subprocesses other than or including the generation of residual data.

In one specific embodiment, in-loop controller 500 includes continuation scheduler 504 to select which deferred block out a number of deferred blocks should be decoded for expeditious decoding. Continuation scheduler 504 at least monitors the data dependencies of each block to one or more frames and/or reference blocks having yet to be deblocked. By monitoring these data dependencies, continuation scheduler 504 can determine when a reference block has been deblocked and then can initiate decoding for the dependent block. In a specific embodiment, continuation scheduler 504 stores associations 560 between each deferred block and its corresponding one or more reference blocks. This way, in-loop controller 500 can monitor which of the reference blocks are deblocked, and then can select those blocks for decoding. In at least one alternative embodiment, continuation scheduler 504 maintains an association between each deferred block and a corresponding frame that includes one or more reference blocks from which it depends. Regardless, continuation scheduler 504 selects deferred blocks for decoding when their corresponding reference blocks and/or frames have been deblocked without regard to any standard decoding order used to normally decode a frame. A standard decoding order normally starts with upper-left cornered blocks and decodes subsequent blocks of the same row from left to right, with following rows each being decoded in a similar order, with the lower-right cornered blocks being last. Advantageously, decoding blocks regardless of standard decoding orders facilitates parallelism by simultaneously deferring blocks, deblocking blocks and decoding blocks.

In at least one embodiment, in-loop controller 500 includes deferment adjuster to adjust an average amount of time between a block is deferred and when it is released for decoding. Deferment adjuster 506 can be configured to adjust the number of blocks a deblocking filter deblocks per deblocking operation. For example, deferment adjuster 506 can set the number of blocks to an amount equal to an entire frame. Accordingly, an entire frame that includes reference blocks must be deblocked before deferred blocks can be decoded. As another example, deferment adjuster 506 can set the number of blocks to establish portions or ranges between which deblocking filter 530 releases pixel data (i.e., makes pixel data available or valid) for reference blocks for a specific portion or range. For instance, if a frame was partitioned into four portions (e.g., four quarters), after deblocking filter 530 deblocks all reference blocks in the first portion, it would release the pixel data for those reference blocks so that deferred blocks can continue decoding. Note that a "range" as used herein with respect to some embodiments can refer to any sized portions and can determine any decoding order.

Figure 6A:
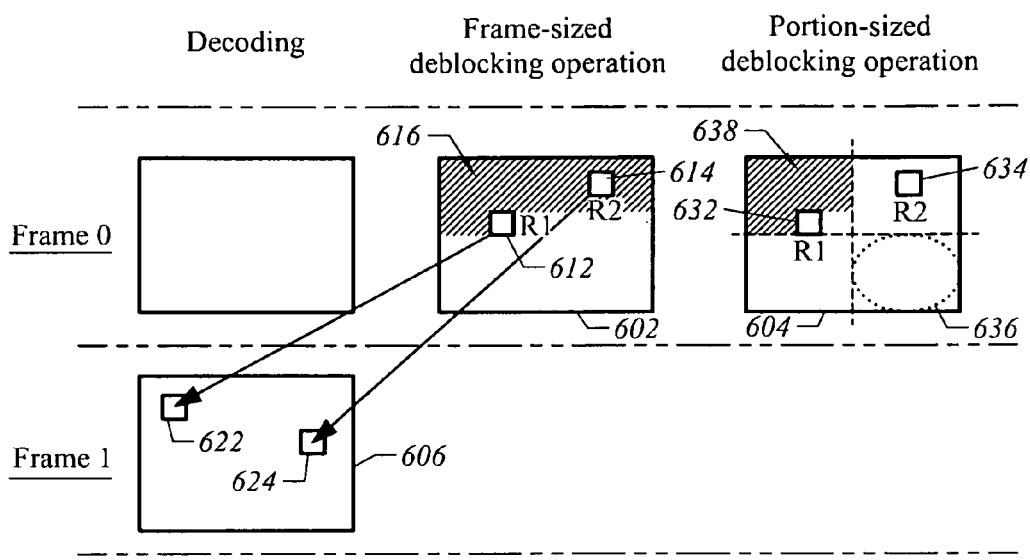
FIGS. 6A and 6B are diagrams depicting a deferment adjuster modifying availability of deblocked reference blocks in accordance with various embodiments of the invention.
Figure 6B:
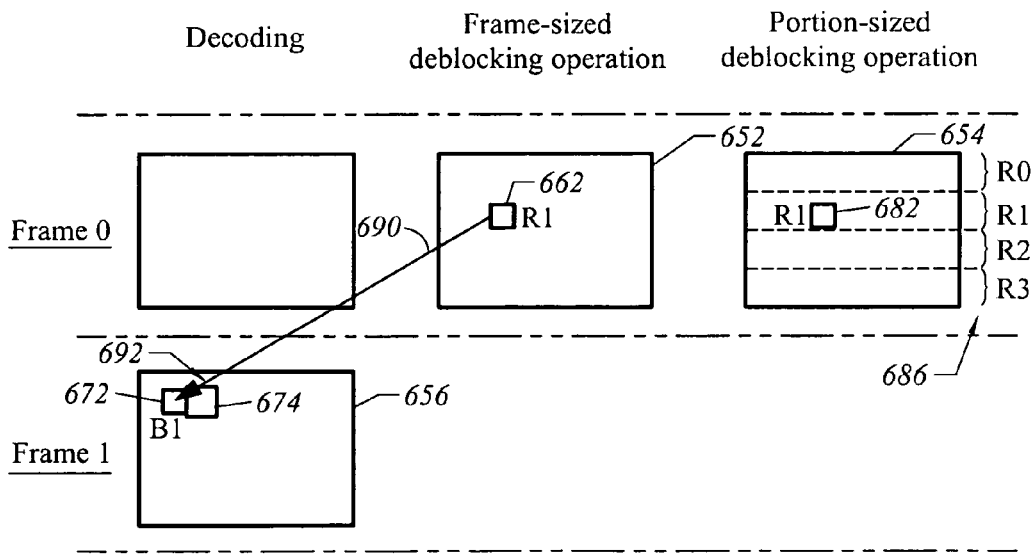

FIGS. 6A and 6B are diagrams depicting a deferment adjuster modifying availability of deblocked reference blocks in accordance with one embodiment of the invention. FIGS. 6A and 6B both show a first frame, Frame 0, passing from a decoding operation to either a frame-sized deblocking operation or to a portion-sized deblocking operation. Frame 0 includes reference frames upon which blocks of Frame 1 depend. Frame 1 is shown undergoing a decoding operation. In FIG. 6A, frame ("Frame 1") 606 includes deferred block ("B1") 622 and deferred block ("B2") 624 that depend on reference block ("R1") 612 and reference block ("R2") 614, respectively. In one embodiment, a deferment adjuster sets the number of blocks to be deblocked equivalent to an entire frame (i.e., frame-size deblocking). As such, the deblocking operation performs deblocking on the entire frame 602 before reference blocks 612 and 614 are useable to decode blocks 622 and 624. Deferring block decoding in this case advantageously avoids a stall in decoding other blocks after block 622. In another embodiment, a deferment adjuster set the number of blocks to be deblocked equal to a quarter 636 of a frame 604 (i.e., portion-size deblocking). Consequently, this modifies the deblocking order to facilitate decoding of deferred blocks for which a reference block has been deblocked. For example, as a deblocking filter processes frame 602 in a standard deblocking order (i.e., from upper left to lower right), reference block 612 is deblocked after reference block 614, thereby making it available after blocks 616 have been deblocked. But by adjusting the number of blocks to be deblocked equal to a quarter 636, then only blocks 638 need be deblocked to provide for decoding of block 622. Since deblocking an amount of blocks 638 is less than deblocking the amount of blocks 616, portion-sized deblocking advantageously decreases the time blocks are deferred, thereby accelerating the decoding process. In at least one embodiment, each quarter 636 (or any other portion size, such as each half or each eighth) is deblocked in parallel by, for example, separate multiple threads of a multi-threaded processor. Note that in some embodiments, different techniques of dividing a frame for deblocking can be applied, such as into quarters, for supporting certain video standards. Note that for H.264 the deblocking is performed from left to right and top down, meaning that deblocking of a frame cannot be divided into parallel operations. However, even though the entire frame is deblocked by a single thread, it may still be advantageous to know when portions of the screen have completed so that deferred blocks within that region finish decoding while deblocking continues with the remaining regions.

In FIG. 6B, frame ("Frame 1") 656 includes deferred block ("B1") 672 and deferred block ("B2") 674, both of which depend on reference block ("R1") 662. In particular, deferred block 672 depends on inter-frame prediction data generated from reference block 662, whereas deferred block 674 depends on intra-frame prediction data generated from deferred block 672, which serves as a reference block for deferred block 674. In one embodiment, a deferment adjuster sets the number of blocks to be deblocked equivalent to an entire frame. As a result, the deblocking operation performs deblocking on the entire frame before reference block 662 of frame 652 is useable to decode block 672 in frame 656. Deferred block 674 can then be decoded once block 672 is completed. Deferring block decoding in this case advantageously avoids a stall in decoding other blocks after block 672. In another embodiment, a deferment adjuster set the number of blocks to be deblocked equal to one of a number of ranges 686 for a frame 654. This modifies the deblocking order to facilitate decoding of deferred blocks, especially block 682. Then, an in-loop controller (e.g., using a continuation scheduler) can test whether each range has completed deblocking to determine when to decode block 672. So after range R1 containing reference block 682 is deblocked, then the in-loop controller can initiate decoding of block 672. Any intra block dependencies, such as block 674, can then be resolved and decoded. In one embodiment, a continuation scheduler such as that described in FIG. 5 maintains a first set of associations 690 for inter-frame prediction data generation and a second set of associations 692 for intra-frame prediction data generation. By monitoring these associations, a continuation scheduler can optimally schedule decoding deferred blocks having a multiple-data dependency.

Figure 7:
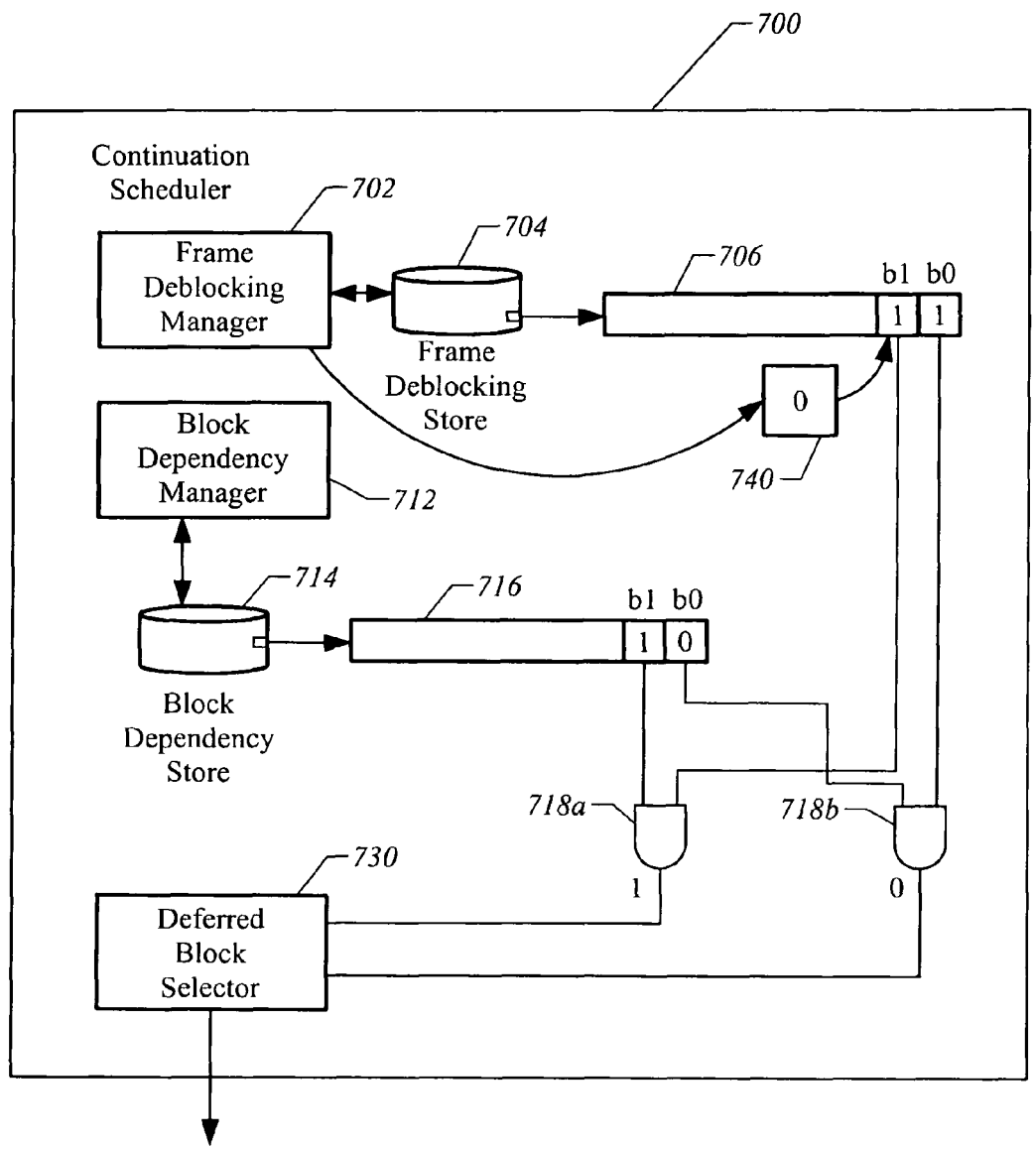
FIG. 7 is a block diagram depicting a continuation scheduler for selecting deferred blocks to decode in accordance with one embodiment of the invention.

FIG. 7 is a block diagram depicting a continuation scheduler for selecting deferred blocks to decode in accordance with one embodiment of the invention. Continuation scheduler 700 is configured to select which decoded blocks need to be deferred, and it includes a frame deblocking manager 702, a frame blocking store 704, a block dependency manager 712, a block dependency store 714, logical operators 718, and a deferred block selector 730. Frame deblocking manager 702 is configured to monitor which frames a deblocking filter is deblocking and to store indicia describing the status of those frames in frame deblocking store 704. An example of such indicia is a set of bits each of which indicates whether a corresponding frame is being deblocked (e.g., a bit having a logic state "1" indicates a frame is being deblocked or has yet to be deblocked). Frame deblocking tally buffer 706 can maintain the set of bits. Block dependency manager 712 is configured to specify the frames on which a decoded block depends, and to store other indicia that describe the dependencies to those frames. An example of such other indicia is a set of bits, each bit indicating whether a deferred block depends on a corresponding frame (e.g., a bit having a logic state "1" indicates a deferred block depends on a frame associated with a bit position or bit number). Logic operators 718 determine whether to defer decoding for a particular block. For example, a non-zero result indicates that the block is to be deferred. Deferred block selector 730 communicates to a deferment index (not shown) to indicate whether a block should be deferred or should be decoded.

To illustrate operation of continuation scheduler 700, consider that a decoded block depends only on frame 1, hence bit 1 is set in block dependency buffer 716 whereas bit 0 is reset because the decoded block does not depend on frame 0. Note when bit 1 in frame deblocking tally buffer 706 is set, any prediction data relying on frame 1 is unavailable for decoding. As such, logical operator 718a yields a non-zero result (e.g., logical 1), which means the decoding of the block should be deferred. But note that when frame deblocking manager 702 detects that frame 1 is no longer being deblocked, it resets bit 1 with bit ("0") 740. Once bit 1 of frame deblocking tally buffer 706 is reset, then logical operator 718a yields a zero result (e.g., logical 0). An ordinarily skilled artisan should recognize that other equivalent implementations can be used to provide the structure and/or functionality of continuation scheduler 700 as well as the in-loop controller generally. Rather than a single bit used for the entire frame, for example, additional bits may be used to narrow data dependencies to subsections of the frame.

Figure 8:
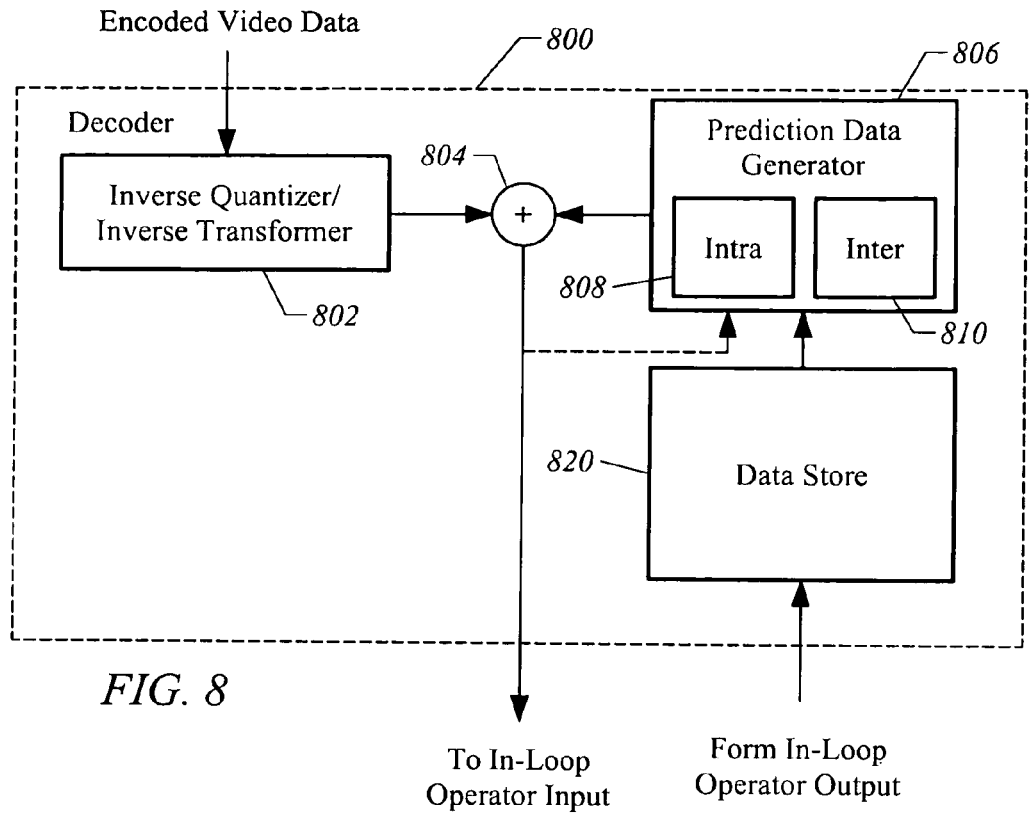
FIG. 8 is an example of a decoder according to one embodiment of the invention.

FIG. 8 is an example of a decoder according to one embodiment of the invention. FIG. 8 depicts a decoder 800 that is suitable for implementing decoder 252 (FIG. 2B). As shown, decoder 800 includes an inverse quantizer and inverse transformer 802 that is configured to calculate a residual by inversely quantizing and inversely transforming (e.g., using a discrete cosine transform, or "IDCT") encoded video data. In some cases, inverse quantizer and inverse transformer 802 can also perform scaling. Decoder 800 includes a prediction data generator 806 that includes a intra-frame prediction generator ("Intra") 808 for forming intra predictions and an inter-frame prediction generator ("Inter") 810 for forming inter predictions. Prediction data generator 806 can support bi-directional motion prediction, which uses both past and future reference frames to predict the contents of a current block (i.e., a reference block as described herein can be a part of either a past or future reference frame). Note that decoder 800 includes an adder 804 for adding residual data from inverse quantizer and inverse transformer 802 and prediction data from prediction data generator 806 to generate decoded blocks prior to application of a deblocking filter operation. Data store 820 is a buffer for storing the decoded video frame as the final video image. Prediction data generator 806 uses pixel data (i.e., reference data) in data store 820 to generate predication data. In one embodiment, decoder 800 complies with at least the H.264 digital video codec standard as maintained by the International Telecommunication Union ("ITU").

Figure 9:
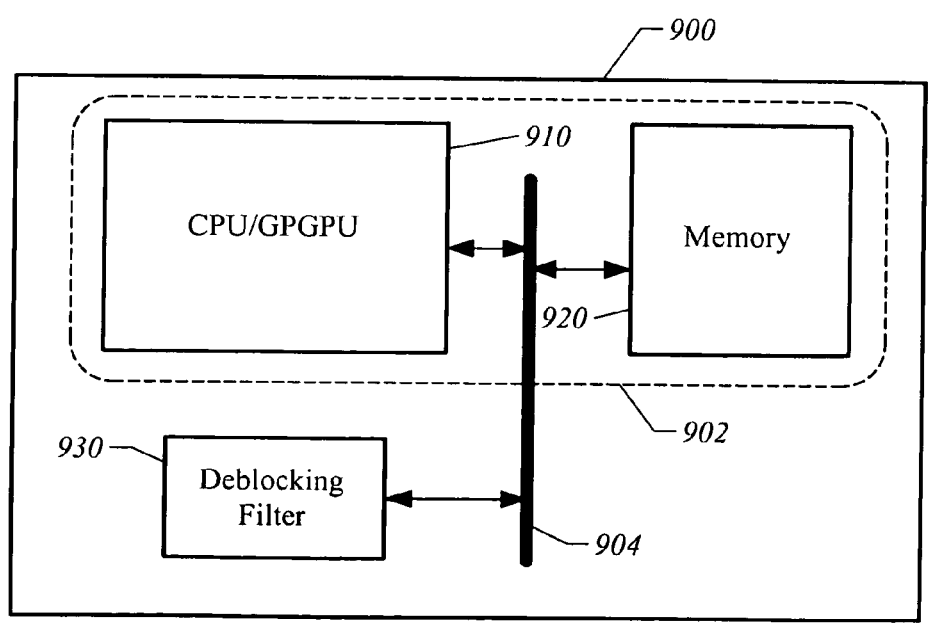
FIG. 9 is an example of an apparatus for converting encoded video image data into decoded video images, according to one embodiment of the invention.

FIG. 9 is an example of an apparatus for converting encoded video image data into decoded video images, according to one embodiment of the invention. FIG. 9 depicts a processor 910 as a central processing unit ("CPU") or a GPU or general purpose graphics processing unit ("GPGPU") coupled to bus 904 to exchange data and program instructions with a memory 920. In one embodiment, the execution of at least a portion of the program instructions stored in memory 920 implements a decoder 902 as described herein, whereas deblocking filter 930 is implemented as an integrated circuit formed to deblock blocks of pixel data, thereby off-loading deblocking filter computations from the processor 910. In one embodiment apparatus 900 is formed on a single substrate as a single chip. In some cases, the term block can refer to a macroblock ("MB") that is structured as a 16×16 pixel luminance block and two 8×8 pixel chrominance blocks. Note that in some of the embodiments described herein, deblocking filter 930 can deblock 4×4 blocks of a macroblock (or any other deblocking block size). In various embodiments, apparatus 900 can be configured to support a variety of CODECs, including Windows Media 9™ (or variants thereof) and AVI of Microsoft, Inc., and the Indeo Video Interactive ("IVI") codec of Intel, Inc, among others known in the art.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to deblocking filters, the discussion is applicable to in-loop as well as out-of-loop operations. While the above descriptions of the various embodiments relate to decoders, the discussion can apply to encoders in some cases. The term block as used herein can describe any collection of pixels in some embodiments. In a specific embodiment, the order of deblocking can be determined by which portion is associated with a largest number of reference blocks (compared to other portions), thereby facilitating decoding a larger number of deferred blocks sooner. Further, one or more portions of a deblocking operation can be performed in parallel. In a specific embodiment, Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A method for nonsequentially decoding portions of digitized video images composed of one or more frames having dependencies to other frames, the method comprising:
   deblocking blocks of a first frame as first frame blocks;
   determining that a block of a second frame depends on a reference block of said first frame blocks; and
   deferring decoding of said block of said second frame to form a deferred block.

2. The method of claim 1 further comprising decoding other blocks of said second frame at least partially concurrent with deferring decoding of said deferred block.

3. The method of claim 2 wherein deblocking said first frame blocks further comprises generating reference data for producing prediction data, wherein deferring decoding of said deferred block occurs during the generation of said reference data, thereby reducing stalls.

4. The method of claim 3 wherein reducing stalls further includes decreasing idle time for a decoder to increase a frame rate at which said first frame and said second frame are decoded that otherwise occurs during said idle time.

5. The method of claim 2 further comprising:
determining said reference block has been deblocked;
classifying said deferred block as an available block for decoding; and
decoding said available block.

6. The method of claim 2 wherein deferring decoding of said deferred block further comprises:
detecting said reference block has yet to be deblocked;
forming an association between said reference block and said deferred block; and
determining whether said reference block has been deblocked,
wherein said association identifies said deferred block for decoding once said reference block is deblocked.

7. The method of claim 6 further comprises:
determining another block of said second frame depends on said deferred block;
forming another association between said reference block and said another block;
decoding said another block after determining said reference block has been deblocked.

8. The method of claim 2 wherein decoding said other blocks includes executing a first thread of program instructions to decode said other blocks and deferring decoding of said deferred block includes executing a second thread of program instructions to decode said deferred block.

9. The method of claim 1 wherein deferring decoding of said deferred block further comprises:
calculating a residual for said deferred block; and
storing said residual for at least a duration in which decoding of said deferred block is deferred,
wherein calculating said residual and storing said residual occurs at least partially concurrent with deblocking blocks of said first frame.

10. A decoder configured to decode a frame constituting video images comprising:
an in-loop controller configured to:
enable decoding of blocks of pixel data in said frame that are independent from another frame; and
defer decoding of a first subset of other blocks of pixel data in said frame that are dependent on the generation of reference data from said another frame;
wherein decoding of said blocks occurs independent of the deferment of said first subset of other blocks.

11. The decoder of claim 10 further comprising:
an in-loop operator configured to perform an in-loop operation to form decoded blocks of decoded pixel data for said another frame,
wherein said in-loop operator is an in-loop deblocking filter.

12. The decoder of claim 10 further comprising a partial decoding manager configured to partially decode said first subset of other blocks prior to the generation of said other reference data.

13. The decoder of claim 12 further comprising a residual path configured to generate residual data for said first subset of other blocks, wherein said partial decoding manager is configured to generate said residual data independent of deferring the decoding of said first subset of other blocks.

14. The decoder of claim 10 further comprising a deferment index configured to identify said first subset of other blocks as requiring decoding once corresponding reference blocks are formed.

15. The decoder of claim 10 wherein said decoder further comprises a deferment adjuster configured to set a number of reference blocks with which to generate said reference data for producing prediction data to decode one or more other blocks in said first subset of other blocks, thereby facilitating decoding of said one or more other blocks while a remainder of other blocks in said first subset of other blocks continue deferment.

16. The decoder of claim 10 wherein said in-loop controller is also configured to form a first association between at least one other block of said first subset and a reference block in said another frame, said reference block including reference pixel data as said reference data from which said prediction data is formed.

17. The decoder of claim 16 wherein said decoder further comprises a continuation scheduler configured to maintain said first association to identify said at least one other block for decoding once said reference block is formed regardless of a standard decoding order.

18. The decoder of claim 16 further comprising:
a prediction path configured to generate said prediction data; and
a deblocking filter configured to generate said reference pixel data for said reference block.

19. The decoder of claim 16 wherein said in-loop controller is further configured to
defer decoding of a second subset of other blocks of pixel data in said frame that are dependent on said first subset of other blocks to be decoded;
form a second association between at least one of said second subset of other blocks and said reference block for decoding said at least one of said second subset of other blocks when said reference pixel data is available.

20. An apparatus for converting encoded video image data into decoded video images comprising:
a decoder for generating blocks of pixel data for a frame, said decoder including;
a residual path configured to generate residual data for said blocks,
a prediction path configured to generate inter-frame prediction data, and
an adder to add said residual data and said inter-frame prediction data to produce said blocks;
a deblocking filter for smoothing said blocks to form reference blocks for another frame, said reference blocks providing pixel data from which to generate said prediction data; and
an in-loop controller configured to defer generating a subset of said blocks until a subset of said reference blocks are formed.

21. The apparatus of claim 20 wherein said decoder further comprises an intra-frame prediction generator for generating intra-frame prediction data, said in-loop controller being further configured to defer generating at least one block until another of said blocks is formed, said prediction path includes a motion compensator, and a data store for storing said reference blocks as at least decoded pixel data, wherein said residual path includes an inverse quantizer, and an inverse discrete cosine transformer ("IDCT").

22. The apparatus of claim 20 wherein said decoder and said in-loop controller are implemented in a general purpose graphics processing unit ("GPGPU") and said deblocking filter is implemented as a separate integrated circuit,
wherein said block is a macroblock ("MB"),
wherein said decoder facilitates compliance with at least digital video codec standard H.264 as maintained by the International Telecommunication Union ("ITU").

* * * * *